United States Patent [19]

Gerber

[11] Patent Number: 4,561,680
[45] Date of Patent: Dec. 31, 1985

[54] SWIVEL JOINT ASSEMBLY

[75] Inventor: David W. Gerber, Massillon, Ohio

[73] Assignee: The Babcock & Wilcox Company, New Orleans, La.

[21] Appl. No.: 756,575

[22] Filed: Jul. 19, 1985

Related U.S. Application Data

[63] Continuation of Ser. No. 552,843, Nov. 16, 1983, abandoned, which is a continuation of Ser. No. 238,268, Feb. 25, 1981, abandoned.

[51] Int. Cl.⁴ ............................................. F16L 17/00
[52] U.S. Cl. ...................................... 285/98; 285/157; 285/168; 285/278; 285/281; 285/368; 285/414; 285/334.1
[58] Field of Search ................. 285/168, 98, 100, 271, 285/95, 261, 278, 334.1, 157, 281, 368, 414

[56] References Cited

U.S. PATENT DOCUMENTS

| 393,139 | 11/1888 | Bodycomb | 285/278 X |
|---|---|---|---|
| 1,221,707 | 4/1917 | Durbin . | |
| 1,564,270 | 12/1925 | Phillips . | |
| 2,712,458 | 7/1955 | Lipson | 285/334.1 X |
| 3,076,667 | 2/1963 | Klingler . | |
| 3,436,079 | 2/1976 | Ekman | 285/98 |

FOREIGN PATENT DOCUMENTS

| 537764 | 6/1959 | Belgium | 285/261 |
|---|---|---|---|
| 1170953 | 11/1969 | United Kingdom | 285/224 |

Primary Examiner—Dave W. Arola
Attorney, Agent, or Firm—Robert J. Edwards; Robert C. Mai; John L. LaPierre

[57] ABSTRACT

An improved spherical swivel joint assembly that substantially connectedly seals consecutively disposed conduit sections while allowing simultaneous angular and lateral joint displacement due to forces exerted at the joint during the transport of fluid therethrough.

1 Claim, 9 Drawing Figures

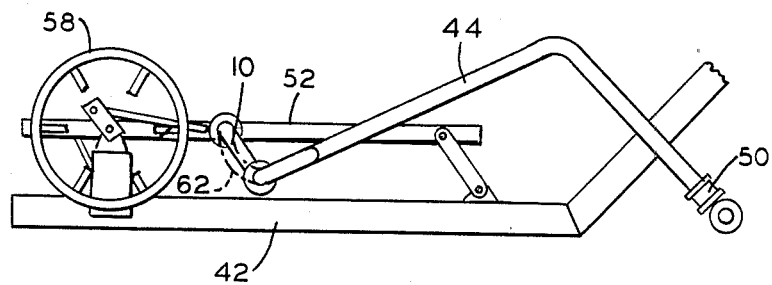
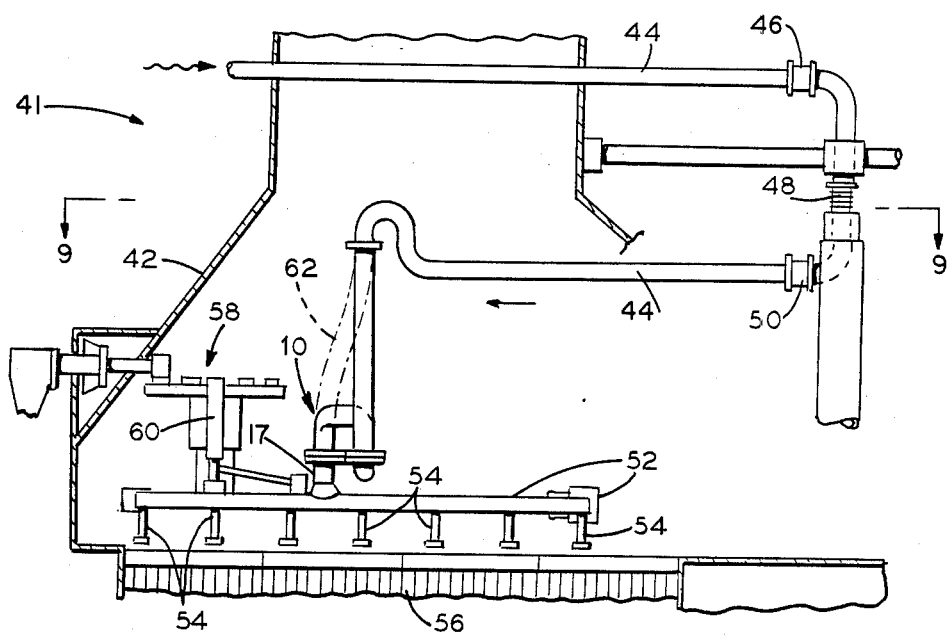

SWIVEL JOINT ASSEMBLY

BACKGROUND OF THE INVENTION

This application is a continuation of application Ser. No. 06/552,843 filed Nov. 16, 1983 and now abandoned, which is a continuation of Ser. No. 238,268 filed 2/25/81, abandoned.

The present invention relates to an improved spherical swivel joint assembly that is used to substantially connect and seal adjacent conduit sections while simultaneously allowing angular and lateral movement at the joint during the passage of fluid therethrough.

The present invention will be discussed in combination with the oscillating fluid nozzle manifold of a sootblower system of a rotary regenerative air heater. However, it should be understood that the improved spherical swivel joint assembly is equally applicable to situations where two conduit sections are to be joined and angular and lateral movement at the connecting joint is desired during fluid transport therethrough.

Sootblowers are used in combination with rotary regenerative air heaters of the type described in U.S. Pat. No. 4,144,680 when ash containing fuels are burned. The air heater in turn is used in combination with a furnace during power generation. Typically, power is generated by the burning of coal in the furnance with the coal burning more rapidly and more completely when the combustion air is heated than it does when the combustion air is cold. The air heater is situated to receive and absorb on heat transfer surfaces heat from the combustion exhaust flue gas and to then transfer this heat to incoming cold air for delivery to the furnace as preheated combustion air.

Combustion exhaust flue gas is high in temperature, is often highly corrosive and contains fly ash and often byproducts of incomplete combustion which are deleterious to the heat transfer surfaces of the air heater and, if allowed to accumulate, these constituents of the flue gas could cause pluggage of gas passageways, damage to the air heater and interruption in heater use. A sootblower which uses jets of pressurized fluid is thus introduced to keep heat transfer surfaces clean of ash accumulation that would hinder flue gas or air flow therethrough and to minimize the buildup of combustible deposits which may accumulate during periods of incomplete combustion, which, if allowed to accumulate, could cause an air heater fire.

Sootblowers used in combination with rotary regenerative air heaters thus operate in a hostile environment which has often led to failure of the sootblower system and heater shutdown. Heretofore, as part of the sootblower system, a corrugated flexible metal hose has been used to provide a connection between the fixed fluid pressure piping and the sootblower's oscillating fluid nozzle manifold. The flexible hose has proven to be highly susceptible to fatigue failure and fly ash erosion which in turn has led to loss of sootblower effectiveness and heater efficiency and costly interruption in heater use.

The object of the present invention is to equip an air heater sootblower system with a pair of interconnected swivel joints to replace the unreliable prior art flexible hose which has proven through use to have a short, limited life expectancy. The dual swivel joint assemblies herein disclosed have been successfully tested under actual operating conditions for prolonged periods of time thus assuring long term sootblower effectiveness, air heater efficiency and dependability. During sootblower use, the installed dual interconnected joint assemblies allow lateral and angular movement at the joints which has virtually eliminated material fatigue failure and fly ash erosion that has plagued the prior art corrugated flexible metal hose.

SUMMARY OF THE INVENTION

The present invention relates to an improved spherical swivel joint assembly that is utilized to substantially connect and seal consecutive conduit sections while permitting both angular and lateral movement at the joint during the transport of a pressurized fluid therethrough. Typically, a pair of interconnected swivel joints or swivel joint assemblies is utilized in combination with the sootblower system of a rotary regenerative air heater to provide communication between inlet and outlet portions of a pressurized fluid supply conduit. The inlet portion of the supply conduit is fixed while the outlet portion is connected to an oscillating fluid nozzle manifold with fluid directing nozzles directing the fluid during surface cleaning onto the air heater heat transfer surfaces and into the passageways formed by the heat transfer surfaces. During sootblower operation, the connecting joints move both laterally and angularly due to forces exertd by the transported fluid and the oscillating fluid nozzle manifold. The rotating joints are caused to seal by fluid pressure forcing mating joint surfaces together.

The various features of novelty which characterize the invention are pointed out with particularity in the claims annexed to and forming a part of this disclosure. For a better understanding of the invention, its operating advantages and specific results obtained by its use, reference should be made to the accompanying drawings and descriptive matter in which there is illustrated and described a typical embodiment of the invention.

BRIEF DESCRIPTION OF THE DRAWINGS

FIG. 8 is a side elevation view of a sootblower system of a rotary regenerative air heater utilizing the pair of interconnected swivel joint assemblies depicted in FIG. 1.

FIG. 9 is a plan view of the sootblower system taken along line 9—9 of FIG. 8.

DETAILED DESCRIPTION OF THE PREFERRED EMBODIMENT

Figure 1:
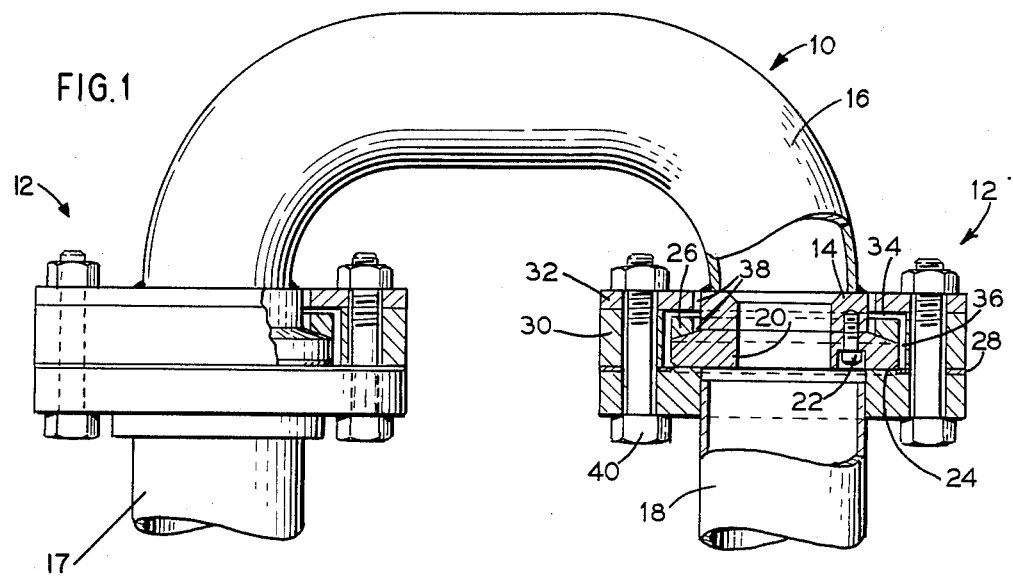
FIG. 1 is a partial sectional elevation view of a pair of interconnected swivel joint assemblies.
Figure 2:
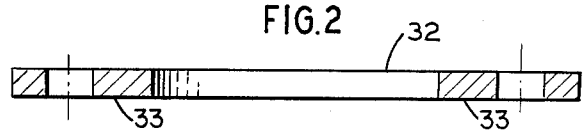
FIG. 2 is an enlarged cross-sectional elevation view of the second annular seal plate depicted in FIG. 1.

Referring to FIG. 1, there is illustrated a partial sectional view of a pair of interconnected spherical swivel joint assemblies 10 characterizing an embodiment of the invention. The lower right portion of FIG. 1 provides a detailed sectional view of an individual spherical swivel joint assembly 12 and FIGS. 2–7 provide enlarged cross-sectional elevation views of the various component parts of spherical swivel joint assembly 12. Therefore, spherical swivel joint assembly 12 will be described with reference to FIGS. 1–7.

Figure 3:
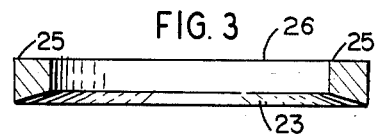
FIG. 3 is an enlarged cross-sectional elevation view of the annular seal member depicted in FIG. 1.
Figure 4:
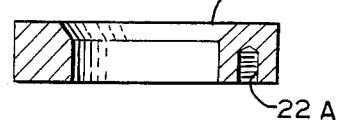
FIG. 4 is an enlarged cross-sectional elevation view of the annular mounting plate depicted in FIG. 1.
Figure 5:
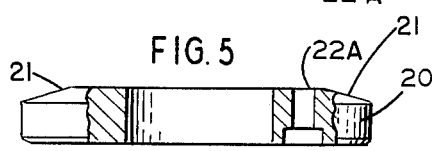
FIG. 5 is an enlarged cross-sectional elevation view of the first annular seal plate depicted in FIG. 1.
Figure 6:
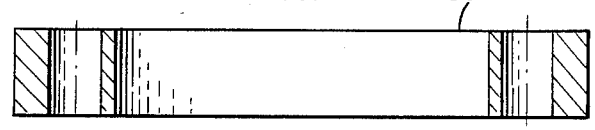
FIG. 6 is an enlarged cross-sectional elevation view of the annular spacer plate depicted in FIG. 1.
Figure 7:
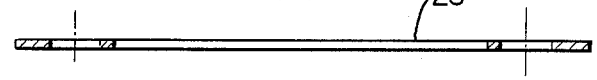
FIG. 7 is an enlarged cross-sectional elevation view of the gasket depicted in FIG. 1.

Spherical swivel joint assembly 12 shown in the at rest position in FIG. 1 is made up of several parts that interact as a unit. A first annular seal plate 20 is axially aligned with and connected by connecting screws 22 placed in screw holes 22A to an annular mounting plate 14 of substantially equal inside diameter which in turn is axially aligned with and connected to a first conduit section 16 by welds or the like. Connecting screws 22 and screw holes 22A are circumferentially spaced about the first annular seal plate 20 and annular mounting plate 14 interface. First annular seal plate 20 is slidably engaged with the flanged surface 24 of a flanged second conduit section 18 and establishes communication between axially aligned first conduit section 16 and flanged second conduit section 18 to provide a passageway for a pressurized fluid therethrough. An annular seal member 26 is slidably engaged with first annular seal plate 20 and spaced from annular mounting plate 14 by separation or gap 38. The wear sealing surface of annular seal member 26 as shown in FIG. 3 is of concave configuration designated 23. The counterpart to the wear sealing surface of annular seal member 26 is the convex wear sealing surface 21 of first annular seal plate 20 shown in FIG. 5. Referring to FIG. 1, an annular spacer plate 30 is interposed between flanged second conduit section 18 and a second annular seal plate 32 with annular spacer plate 30 being spaced from first annular seal plate 20 and annular seal member 26 at a distance designated 36. Annular spacer plate 30 is sized to provide a separation or gap designated 34 between annular seal member 26 and second annular seal plate 32. A gap 38 is provided between second annular seal plate 32 and annular mounting plate 14. To complete and make the assembly operable, couplings or bolts 40 or the like are provided to couple second annular seal plate 32 and annular spacer plate 30 to flanged second conduit section 18. The size of separations 34, 36 and 38 are not critical so long as spherical swivel joint assembly 12 maintains connection between first and second conduit sections 16 and 18 respectively. As an aid in retarding leakage at the joint, a gasket 28 is placed between flanged second conduit section 18 and annular spacer plate 30.

During the passage of a pressurized fluid through connecting spherical swivel joint assembly 12, fluid transport may be in either direction through the joint, annular seal member 26 is free to move laterally in any direction in a plane parallel to the seal surface 33 of second annular seal plate 32. This lateral movement is limited by the inside diameter of annular spacer plate 30. The wear surface of first annular seal plate 20 is a convex wear sealing surface 21 that mates to the concave wear sealing surface 23 of annular seal member 26. Sealing is accomplished by the pressurized fluid forcing of mating seal surface 21 of first annular seal plate 20 into contact with mating seal surface 23 of annular seal member 26 while simultaneously forcing mating seal surface 25 of annular seal member 26 into contact with mating seal surface 33 of second annular seal plate 32. The mating seal surfaces act as a ball joint allowing simultaneous movement in two planes in addition to the rotary motion of the joint itself. The joint assembly substantially connectedly seals the two conduit sections while permitting simultaneous angular and lateral joint movement during fluid transport therethrough.

Referring now to FIGS. 8 and 9, there is shown a plan and an elevation view of a sootblower system of a rotary regenerative air heater 41 utilizing the pair of interconnected swivel joint assemblies 10 depicted in FIG. 1. The sootblower system is disposed within air heater hood 42 and is composed of a fixed pressurized fluid supply conduit with inlet portion 44; an expansion joint 46, a sliding seal 48 and a second expansion joint 50 disposed along the conduit; a pair of interconnected swivel joint assemblies 10 connecting inlet portion 44 and flanged pressurized fluid supply conduit outlet or discharge portion 17; a fluid nozzle manifold 52 connected to conduit discharge portion 17; a plurality of nozzles 54 connected to fluid nozzle manifold 52 and directed toward heat transfer surfaces 56 and a paddle wheel 58 and crank drive 60 connected to fluid nozzle manifold 52.

It is to be understood that pressurized fluid supply conduit inlet portion 44 is equivalent to flanged second conduit section 18 depicted in FIG. 1. Furthermore, it should be noted that the pair of interconnected swivel joint assemblies 10 depicted in FIG. 1 replace the prior art corrugated flexible metal hose 62 depicted in FIGS. 8 and 9.

During sootblower operation, a pressurized fluid, or air, steam or the like, is supplied from a source, not shown, and is conveyed through the inlet portion 44 of a fixed pressurized fluid supply conduit and is delivered through a pair of interconnected swivel joint assemblies 10 which connect inlet and discharge portions 44 and 17 respectively of the supply conduit. Conduit discharge portion 17 is connected to fluid nozzle manifold 52 which is supported by air heater hood 42. Nozzle manifold 52 has a plurality of nozzles 54 connected thereto which direct the pressurized fluid toward heat transfer surfaces 56. Nozzle manifold 52, which is driven by crank drive 60 and paddle wheel 58, oscillates across heat transfer surfaces 56 while air heater hood 42 rotates over the heat transfer surfaces. The pressurized fluid delivered to heat transfer surfaces 56 through nozzles 54 removes accumulated ash and combustible deposits from the heat transfer surfaces. The pair of interconnected swivel joint assemblies 10 installed in the sootblower system herein described substantially connectedly seals inlet and discharge portions 44 and 17 of the fixed pressurized fluid supply conduit and permit, during sootblower operation, simultaneous angular and lateral movement at the connecting joints during fluid transport therethrough.

While in accordance with the provisions of the statutes there is illustrated and described herein a specific embodiment of the invention, those skilled in the art will understand that changes may be made in the form of the invention covered by the claims, and that certain features of the invention may sometimes be used to advantages without corresponding use of the other features.

The embodiments of the invention in which an exclusive property or privilege is claimed are defined as follows:

1. A swivel joint assembly for angular and lateral motion between a first and second conduit transporting a pressurized fluid comprising:
   (a) an annular mounting plate rigidly connected at one face to a movable first conduit section;

(b) a first annular seal plate having a spherical convex surface at the periphery of one face, means for fixedly attaching said first annular seal plate to the opposite face of the mounting plate and said first annular seal plate sized so that the convex surface extends beyond the periphery of the mounting plate;

(c) a fixed second conduit section having a flange abutting the opposite face of the first annular seal plate, said flange having a diameter larger than the diameter of said first annular seal plate, the second annular conduit having a greater internal diameter than the internal diameter of the first annular seal plate;

(d) a spacer plate mounted on the flange of the second conduit section and spaced from the periphery of the first seal plate;

(e) a second annular seal plate mounted on the spacer plate, overlapping the convex surface of the first seal plate and circumferentially spaced from the mounting plate thereby maintaining the joint in assembled relationship;

(f) means for rigidly attaching together the flange of the second conduit section, the spacer plate and the second seal plate; and (g) a seal member interposed between the first and second seal plates having a concave spherical surface mating with the convex spherical surface of the first seal plate and spaced from the second seal plate whereby, upon pressurization of the conduits, the net force acting on the opposite face of the first seal plate which radially extends within the internal diameter of the second conduit forces the seal member into slidable contact with the second seal plate, thereby sealing the joint, transverse movement between the conduits is effected within the space between the spacer plate and the first seal plate, rotary movement is effected by slidable contact between the seal member and the second seal plate, and movement in a plane perpendicular to the second seal plate is effected between the mating surface of the first seal plate and the seal member.

* * * * *